(12) United States Patent
Agrawal et al.

(10) Patent No.: US 7,657,585 B2
(45) Date of Patent: Feb. 2, 2010

(54) AUTOMATED PROCESS FOR IDENTIFYING AND DELIVERING DOMAIN SPECIFIC UNSTRUCTURED CONTENT FOR ADVANCED BUSINESS ANALYSIS

(75) Inventors: Neeraj Agrawal, Delhi (IN); Scott R. Holmes, Morgan Hill, CA (US); Ana Lelescu, Morgan Hill, CA (US); Kiran Mehta, Castro Valley, CA (US); Hongcheng Mi, Sunnyvale, CA (US)

(73) Assignee: Innternational Business Machines Corporation, Armonk, NY (US)

( * ) Notice: Subject to any disclaimer, the term of this patent is extended or adjusted under 35 U.S.C. 154(b) by 275 days.

(21) Appl. No.: 11/257,880

(22) Filed: Oct. 25, 2005

(65) Prior Publication Data

US 2007/0100914 A1    May 3, 2007

(51) Int. Cl.
*G06F 17/30* (2006.01)
*G06F 17/00* (2006.01)

(52) U.S. Cl. .......................................... 707/205; 707/3
(58) Field of Classification Search ................... 707/205
See application file for complete search history.

(56) References Cited

U.S. PATENT DOCUMENTS

| | | | | |
|---|---|---|---|---|
| 5,590,317 A * | 12/1996 | Iguchi et al. | ..................... | 707/2 |
| 5,832,496 A * | 11/1998 | Anand et al. | ................. | 707/102 |
| 6,145,003 A * | 11/2000 | Sanu et al. | .................. | 709/225 |
| 6,151,601 A * | 11/2000 | Papierniak et al. | ............ | 707/10 |
| 6,487,539 B1 | 11/2002 | Aggarwal et al. | | |
| 6,636,860 B2 | 10/2003 | Vishnubhotla | | |
| 7,062,394 B2 * | 6/2006 | Sun | .............................. | 702/75 |
| 7,418,435 B1 * | 8/2008 | Sedlar | ........................... | 707/1 |
| 2002/0049792 A1 * | 4/2002 | Wilcox et al. | ............... | 707/522 |
| 2002/0184255 A1 * | 12/2002 | Edd et al. | .................... | 707/500 |
| 2003/0018624 A1 * | 1/2003 | Hsiao et al. | ..................... | 707/3 |
| 2003/0177179 A1 * | 9/2003 | Jones et al. | .................. | 709/203 |
| 2003/0233356 A1 | 12/2003 | Dean et al. | | |
| 2004/0177063 A1 | 9/2004 | Weber et al. | | |
| 2004/0249836 A1 | 12/2004 | Reynders et al. | | |
| 2005/0065944 A1 * | 3/2005 | Gunther et al. | ............. | 707/100 |
| 2005/0091193 A1 | 4/2005 | Frank et al. | | |
| 2005/0138056 A1 * | 6/2005 | Stefik et al. | .................. | 707/102 |
| 2005/0160088 A1 | 7/2005 | Scallan et al. | | |

OTHER PUBLICATIONS

Tretau, et al., "Webfountatin Application Development Guide," IBM SG24-7029-01, Sep. 28, 2004, Redbooks, 368 pages.

(Continued)

*Primary Examiner*—James Trujillo
*Assistant Examiner*—Dawaune Conyers
(74) *Attorney, Agent, or Firm*—Gibb I.P. Law Firm, LLC

(57) ABSTRACT

A cost efficient solution for supporting and deploying custom text analytics applications suited is to provide third party application developers a sand-boxed application development environment such as an appliance computer system, allowing users to leverage data integration, indexing and pre-existing mining platform capabilities for a domain-specific data. Thus, embodiments herein present a system, method, etc. for identifying and delivering domain specific unstructured content for advanced business analysis. The system generally comprises a cluster computer system, a gateway computer system and an appliance computer system.

6 Claims, 3 Drawing Sheets

OTHER PUBLICATIONS

Dibbern, et al., "Information Systems Outsourcing: A Survey and Analysis of the Literature," The Data Base for Advances in Information Systems, vol. 35, No. 4, Fall 2004, pp. 6-102.

Piero Fraternali, "Tools and Approaches for Developing Data-Intensive Web Applications: A Survey," ACM Computing Surveys, vol. 31, No. 3, Sep. 1999, pp. 227-263.

European Application No. 06 807 119.0-2201, ARC920050068EP1, Communication pursuant to article 94(3) EPC, Mar. 27, 2009.

Agrawal, et al., "TAP: A Platform for Enabling Enterprises to Develop Business Specific Text Analytic Applications" Advances in Data Management, Proceedings of the 11th International Conference on Management of Data, pp. 103-111, 2005.

Halsall F., "Data Communications, Computer Networks, and Open Systems, 11.2 Session Layer" Data Communications, Computer Networks and Open Systems, pp. 567-570, 1992, XP002383620.

* cited by examiner

AUTOMATED PROCESS FOR IDENTIFYING AND DELIVERING DOMAIN SPECIFIC UNSTRUCTURED CONTENT FOR ADVANCED BUSINESS ANALYSIS

BACKGROUND OF THE INVENTION

1. Field of the Invention

Embodiments herein present a system, method, etc. for identifying and delivering domain specific unstructured content for advanced business analysis.

2. Description of the Related Art

In just a few years, the Internet made large amounts of unstructured information instantly and ubiquitously available and it has had a tremendous impact on society and business. Breakthrough technologies provide Web scale text mining and discovery platforms that contain very large, distributed repositories (i.e. cluster) with valuable metadata that is automatically extracted from billions of documents, including Web pages, Web logs, bulletin boards, newspapers, etc.

Despite such advances, Web scale repositories contain large amounts of unstructured information but no domain-specific context is associated with it. An automated process is desired to create and maintain a domain specific, contextual data repository of unstructured content for different business or logical domains. An "on-topic store" for a domain consists of Web pages and associated contextual metadata such as dates, geo locations and company names that is relevant to that domain. The on-topic store may be used as the starting point for running more complex analytics specific to that domain. The more topic-focused the store it is, the faster and more efficient the domain-specific analytics can be.

Furthermore, there is a high cost associated to custom text analytics application support and deployment. There are at least two situations where this occurs: first, in an application delivery model in which analytics applications access huge volumes of data by talking directly to the cluster, and second by using standard database or data feed of limited mined data that is application specific. There are no known solutions to these problems.

SUMMARY OF THE INVENTION

A low-cost solution for supporting and deploying custom text analytics applications suited is to provide third party application developers a sand-boxed application development environment such as an appliance computer system, allowing users to leverage data integration, indexing and pre-existing mining platform capabilities for a domain-specific data. Thus, embodiments herein present a system, method, etc. for identifying and delivering documents of interest (i.e., domain specific unstructured content) for advanced business analysis. The system generally comprises a cluster computer system, a gateway computer system and an appliance computer system. More specifically, the cluster computer system is adapted to store content comprising the documents of interest, analyze the content, and store metadata, wherein the documents of interest comprise documents of interest to a user.

The metadata comprises explicit and derived metadata, wherein the explicit metadata is expressly defined by the content, and wherein the derived metadata is defined by analyzing the content. The system further comprises an analysis engine operatively connected to the cluster computer system, wherein the analysis engine produces the derived metadata via annotation of the content.

The gateway computer system is logically interconnected to the cluster computer system and is adapted to access the metadata, retrieve the documents of interest from the cluster computer system described by a query, and send the documents of interest. Moreover, the gateway computer system is adapted to divide the documents of interest into segments, based on when the documents of interest were stored on the cluster computer system, and send the segments to the appliance computer system incrementally.

The appliance computer system is logically interconnected to the gateway computer system and is adapted to display the metadata, build the query based on the metadata, and receive the documents of interest described by the query. Further, the appliance computer system comprises domain specific storage for storing the documents of interest described by the query, wherein the documents of interest is readily available on demand for conducting business analysis.

In addition, the system further comprises a throttling component operatively connected to the appliance computer system and a compression component operatively connected to the cluster computer system. The throttling component is adapted to adjust the rate that the documents of interest are retrieved from the cluster computer system; and the compression component is adapted to compress the documents of interest. The throttling component and the compression component control the workloads of the gateway computer system and the appliance computer system.

Thus, the method selects a gateway computer system and an appliance computer system, wherein the appliance computer system is logically interconnected with the gateway computer system. When access is allowed to the gateway computer system and the appliance computer system, the method further comprises receiving content comprising documents of interest and defining explicit metadata, wherein the explicit metadata is expressed by the content. Following this, derived metadata is defined by analyzing the content, wherein the derived metadata is produced via annotation of the content. The method then displays the explicit metadata and the derived metadata and stores the content, the explicit metadata and the derived metadata. Subsequently, a query is built based on the explicit metadata and the derived metadata. Finally, documents of interest described by the query are retrieved via the gateway computer system and sent to the appliance computer system.

Additionally, the method can comprise dividing the documents of interest into segments, based on when the documents of interest were stored, and sending the segments to the appliance computer system incrementally. Furthermore, to control the workloads of the gateway computer system and the appliance computer system, the rate that the documents of interest are retrieved can be adjusted; and/or, the documents of interest can be compressed.

Accordingly, the appliance computer system can be leveraged to design and implement an automated process for identifying and delivering domain specific unstructured content. This process involves a new architecture that allows users and application developers to access only domain specific metadata of interest (e.g. automotive industry data) stored on the cluster computer system, store this data on the appliance computer system, and then use it for more advanced analysis as part of developing their custom business applications. Furthermore, this process is characterized by a set of user-defined features, which include strong security, metering, status monitoring, scheduling, incremental updates, segmented runs, throttling, and compressed data transfer.

This solution is cost efficient and provides an automated process for leveraging existing platform capabilities, creating domain specific unstructured content on demand for further analysis and processing and supporting an array of technical features that provide users the option to customize and quickly adapt their applications on demand. Although the concept of the appliance computer system is not new, it has never been used before for creating domain specific "on-topic-stores" on demand, based on user's queries, for the purpose of providing complex business analysis.

These and other aspects of embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the embodiments of the invention without departing from the spirit thereof, and the invention includes all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS OF THE INVENTION

Figure 1:
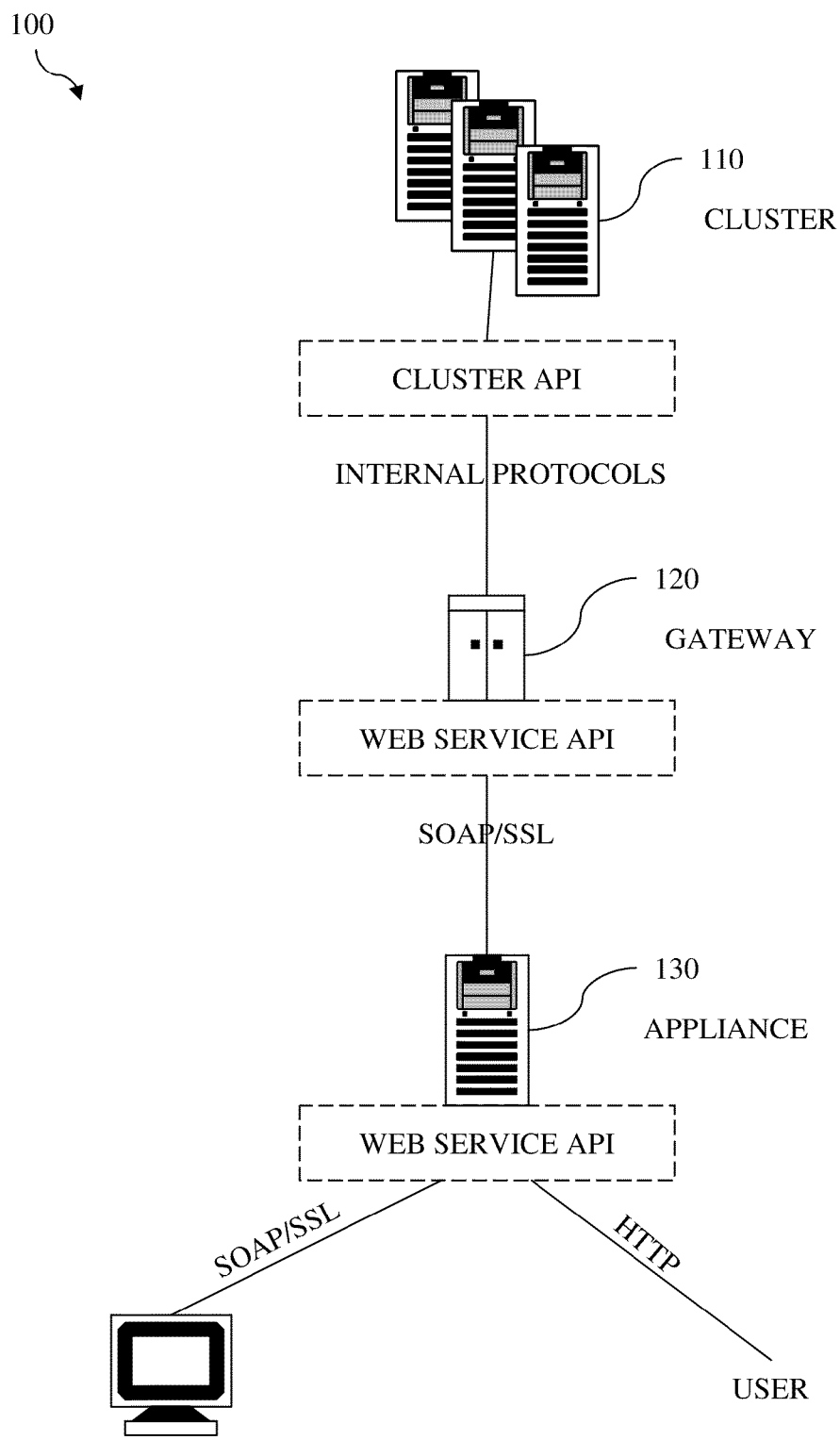
FIG. 1 is a schematic diagram illustrating a system of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the invention.

Embodiments of the invention comprise an appliance computer system that can be leveraged to design and implement an automated process for identifying and delivering domain specific unstructured content. This process involves a new architecture that allows users and application developers to access only domain specific metadata of interest (e.g. automotive industry data) stored on the cluster computer system, store this data on the appliance computer system, and then use it for more advanced analysis as part of developing their custom business applications. Furthermore, this process is characterized by a set of user-defined features, which include strong security, metering, status monitoring, scheduling, incremental updates, segmented runs, throttling, and compressed data transfer.

This solution is cost efficient and provides an automated process for leveraging existing platform capabilities, creating domain specific unstructured content on demand for further analysis and processing, and supporting an array of technical features that provide users the option to customize and quickly adapt their applications on demand. An appliance computer system has never been used before for creating domain specific "on-topic-stores" on demand, based on user's queries, for the purpose of providing complex business analysis.

Referring to the drawings, FIG. 1 illustrates one embodiment of the invention. More specifically, FIG. 1 illustrates a system for identifying and delivering domain specific unstructured content for advanced business analysis comprising cluster computer system 110, gateway computer system 120, and appliance computer system 130. Specifically, cluster computer system 110 is part of a web-scale mining and discovery platform containing distributed repositories with large sets of ambiguous unstructured data and metadata. Gateway computer system 120 is responsible for handling queries against the cluster (i.e., cluster computer system 110) securely. This is implemented by exposing a set of well-defined set of simple object access protocol (SOAP) Web Services that translate the appliance's (i.e., appliance computer system 130) query requests into application program interfaces (APIs) supported by the cluster. The appliance is responsible for storing and indexing domain specific data. The appliance also provides advanced text mining capabilities supported by the platform. In addition, a dedicated tool, called the On-Topic-Store-Builder (OTSB) is provided by the appliance and allows users to build complex query and retrieve relevant metadata from the cluster for a specific domain of interest.

Embodiments of the invention provide security, metering and status monitoring. More specifically, security ensures that only authenticated and authorized users can get access to the cluster data. The appliance communicates with the gateway (i.e., gateway computer system 120) using simple object access protocol over secure sockets layer (SSL) with mutual certificate based authentication. Users communicate with the appliance either over Hypertext Transfer Protocol (HTTP) or using simple object access protocol over secure sockets layer. The users access the appliance web applications and authenticate using a userid and password. Machine to machine communication is done only over secure sockets layer.

Further, metering provides the ability to track specific service and system usage then can be used in turn to generate a cost model for the customers. Status Monitoring enables administrators and users to determine at any point in time the process status (e.g., running, completed, failed).

Embodiments of the invention further provide scheduling, incremental updates and segmented runs. More specifically, scheduling allows users to customize, modify and automate the whole process. For example, run every week on Monday at 1:00 AM. This feature ensures that resources are better used.

Moreover, incremental updates allow users to re-use the existing stored data and update a local repository (i.e. store) on the appliance only with recent data. This is implemented by logging the date of the last run of the process and automatically filtering all data that has a crawl date bigger than this date.

Segmented runs are used in combination with the incremental updates and provide a fault-tolerance mechanism for the whole process. For large amounts of data (millions of crawled web pages) this process takes a long time to complete and it is not desired to restart the whole process if failure occurred. This feature is implemented by segmenting cluster data to be retrieved by date. The process runs then sequentially, retrieving data for dates within user defined time intervals (six months for example).

To control the workloads of the gateway and appliance, embodiments of the invention further provide for throttling and compressed data transfer. More specifically, throttling enables users to adjust the retrieval process performance on the fly while compressed data transfer boosts the performance and network transfer speed for users requesting US cluster data from India, for example.

Figure 2:
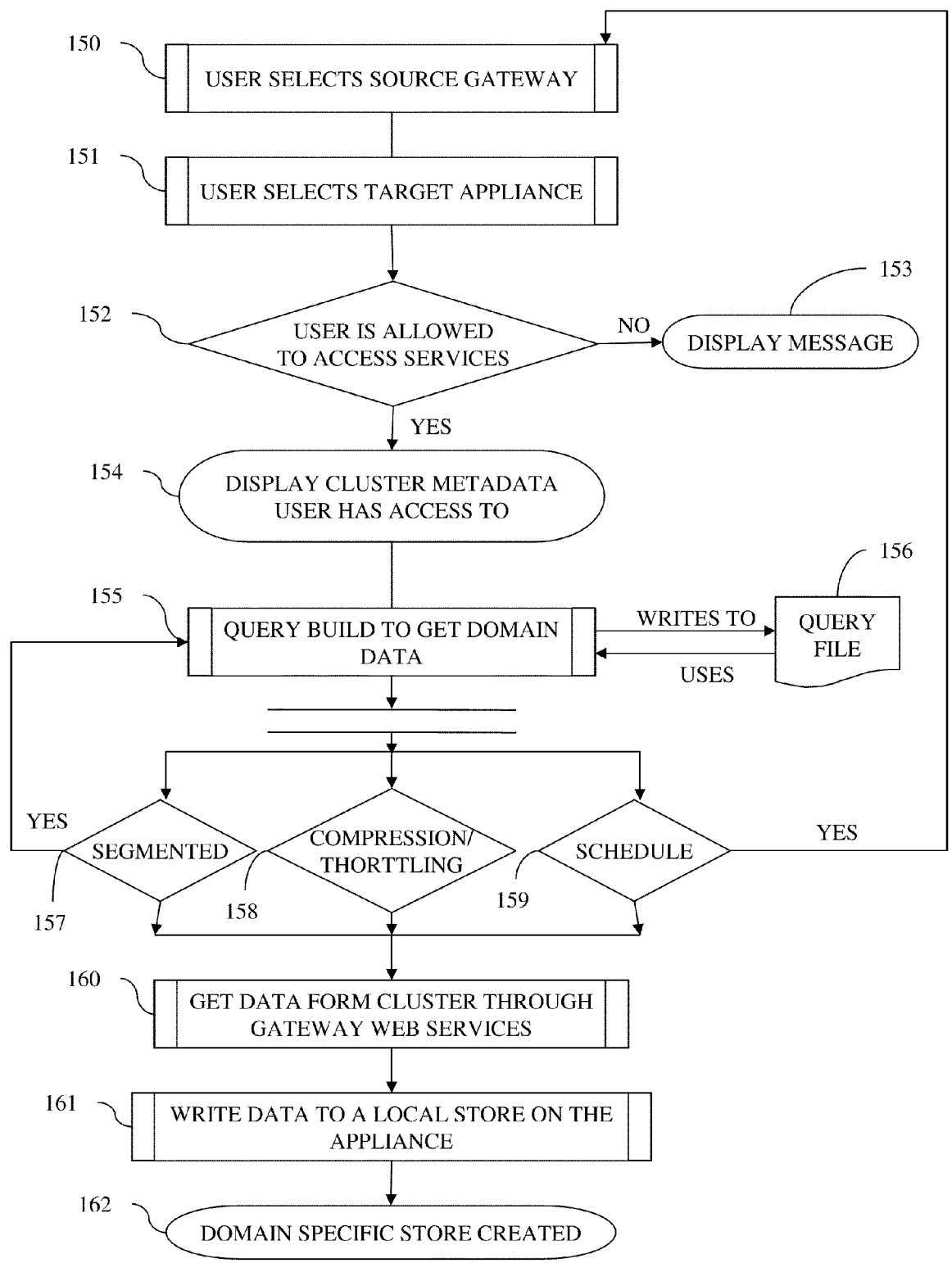
FIG. 2 is a flow diagram illustrating a method of the invention.

Referring to FIG. 2, the method begins by the user selecting a source gateway 150 and a target appliance 151. If the user is not allowed to access resources on either the gateway or the appliance, a security message is displayed 153. If access is allowed 152, the system displays only the cluster metadata the user is allowed to access 154. Next, a query build subprocess is involved where the user can build a custom query that describes domain-specific data he or she is interested in 155. The user can save this query to a file 156 for later use/modification. In parallel, several decision points may occur. For example, if a segmented 157 option is selected, the query is automatically augmented with the user's selected segment interval for filtering data based on crawl dates. If a schedule 159 option is selected, the process is re-started automatically based on the time parameters specified. Further, once enabled by the users, compression and throttling 158 are supported on the fly. Following this, data is accessed from the cluster via the gateway 160. Once data is retrieved, it is written back to a target store on a local appliance, wherein the local store 161 holds the user's domain specific data 162.

Thus, embodiments herein present a system, method, etc. for identifying and delivering domain specific unstructured content for advanced business analysis. The system generally comprises cluster computer system 110, gateway computer system 120 and appliance computer system 130. Cluster computer system 110 refers to a specialized interconnected set of computers setup as a web-scale mining and discovery platform. Cluster computer system 110 is responsible for crawling, indexing, storing and analyzing large amounts of unstructured content rapidly.

Moreover, cluster computer system 110 is adapted to store content comprising documents of interest and metadata relating to the content. The documents of interest comprise documents of interest to a user. More specifically, documents of interest refer to a subset of content on cluster computer system 110 that has been deemed relevant by a user of appliance computer system 130 for the purpose of a more detailed business analysis by the user. The documents of interest exclude content on cluster computer system 110 that is not relevant for the purpose of a more detailed analysis by the user and thereby reduces the computational effort required for such subsequent business analysis. Further, the documents of interest are retrieved from cluster computer system 110 to appliance computer system 130 via gateway computer system 120.

Cluster computer system 110 is also adapted to analyze the content, as more fully described below. The metadata relating to the content comprises explicit and derived metadata, wherein the explicit metadata is expressly specified by the content. For example, explicit metadata can include the author, title, date of document, size of document, etc. The derived metadata is not expressly defined by the content; rather, the derived metadata is defined by analyzing the content. The derived metadata is computed on cluster computer system 110 by running one or more analysis engines on the content. When initially stored on cluster computer system 110, a document only comprises explicit metadata. Over time, the document will be annotated by the analysis engines with additional data tags (i.e., derived metadata). It is possible for a single document to contain hundreds of data tags.

Examples of derived metadata include: "source", "date of content", "duplicate", "language", "topic", "sentiment", etc. More specifically, "source" indicates the source of the document, e.g., a web-site, a blog extract, a news feed, an internal data source, a paid document (analyst reports), etc. The "date of the content" indicates the date or period of time being referred to in the documents as opposed to the creation of the document. For example, if a news article says: "Date: Jan. 10, 1999 AP Report. The police released more details about the suspect yesterday . . . ", it can be inferred that although the news article is from the 10th of January, it is referring to events from the 9th of January (i.e., yesterday). Further, since a single document can refer to multiple dates, more than one "date of content" tag can be provided per document.

Moreover, "duplicate" indicates whether the document is unique or is a duplicate of another document. This is true when the same news story or technical article is picked up by multiple agencies and reported on the web, blogs, etc. multiple times. Often it is useful to have only one copy of such a document on the system; although, it sometimes could be useful in certain types of analysis to know how many times the same content appeared on the web (i.e., to show popularity of the topic). To identify the full list of duplicates, all the documents in the cluster must be analyzed to make this determination. Further analysis of the documents can result in more metadata, e.g., for identifying the master copy.

Next, "language" indicates the language that the document is written in. Often the language of the document is not explicitly called out and has to be derived by analyzing the content of the document. "Topic" indicates what topic(s) the document is directed towards, e.g., automobiles, politics, sports, etc. The level of granularity is determined by the cluster analysis engines. "Sentiment" indicates the sentiment about a topic. Often times, pages express either a positive or negative sentiment about a topic. Often the sentiment is neutral. Analysis engines create such annotations on the cluster data.

Gateway computer system 120 refers to a specialized computer responsible for providing secure access to cluster computer system 110. Gateway computer system 120 allows the system administrator to setup access to selective content and metadata of cluster computer system 100 for each user. For example, a user can be given access only to news-feeds (and not to web-content or third party paid content) from cluster computer system 110; and further limit access only to the raw documents and 'date of content' metadata. Multiple users from multiple appliance computer systems 130 can be logically connected to gateway computer system 120.

Moreover, gateway computer system 120 is logically interconnected to cluster computer system 110 and is adapted to access the metadata. As discussed above, only authenticated and authorized users can get access to the metadata. Gateway computer system 120 is also adapted to retrieve documents of interest from cluster computer system 110 described by a query and send the documents of interest to appliance computer system 130. As discussed above, this is implemented by exposing a set of well-defined set of simple object access protocol Web Services that translate appliance computer system 130's query requests into application program interfaces supported by cluster computer system 110.

Moreover, gateway computer system 110 is adapted to divide the documents of interest into segments, based on when the documents of interest were stored on cluster computer system 110, and send the segments to appliance computer system 130 incrementally. The timestamp of when a document was stored is constant for a document (i.e., does not change over time) and is continuously increasing across documents (i.e., when a new document is brought into cluster computer system 110, it will always have a larger timestamp compared to all other documents already in cluster computer system 110). This is required if the retrieval needs to be restarted, for example, after a system failure, or if the incremental updates to the on-topic store need to be made, they can be done efficiently without redoing a lot of the processing.

The following is an example for the system failure scenario: the segment interval is six months (15,778,800 seconds) and the process to build an on-topic store was started with a start timestamp of Jan. 1, 1990. The system will retrieve documents of interest from cluster computer system 110 in six month increments. Assume the system has completed the process of transferring documents from cluster computer system 110 up to Dec. 31, 2003 and is in the middle of the segment Jan. 1, 2004 to Jun. 30, 2004 when the system has a failure. When the system is restarted, the process of retrieving documents can resume from Jan. 1, 2004. This way only the processing for the last segment needs to be redone. The following is an example of incremental update to an on-topic store: an on-topic store was built and the T1 is the last timestamp of when the page was stored in cluster computer system 110. When the incremental update is required to the on-topic store, gateway computer system 120 can request that only pages that were stored in cluster computer system 110 since T1 be retrieved. When all the documents for this iteration of the incremental update are complete, the new timestamp T2 can be remembered for the next iteration of the incremental update.

Appliance computer system 130 refers to a specialized computer system responsible for building an on-topic store by defining a query, retrieving the documents of interest from cluster computer system 110 via gateway computer system 120 and storing the documents. Further, appliance computer system 130 allows for further analytics to be performed on the retrieved documents of interest. Appliance computer system 130 allows for multiple on-topic stores to be created and analyzed.

Moreover, appliance computer system 130 is logically interconnected to gateway computer system 120 and is adapted to display the metadata, build the query based on the metadata, and receive the documents of interest described by the query. Further, appliance computer system 130 comprises domain specific storage for storing the documents of interest described by the query, wherein the documents of interest are readily available on demand for conducting business analysis. As discussed above, appliance computer system 130 communicates with gateway computer system 110 using simple object access protocol over secure sockets layer with mutual certificate based authentication. Users communicate with gateway computer system 110 either over hypertext transfer protocol or using simple object access protocol over secure sockets layer. The users access the appliance computer system 130's web applications and authenticate using a userid and password.

In addition, the system further comprises a throttling component operatively connected to appliance computer system 130 and a compression component operatively connected to cluster computer system 110. The throttling component is adapted to adjust the rate that the documents of interest are retrieved from cluster computer system 110; and the compression component is adapted to compress the documents of interest. The throttling component and the compression component control the workloads of gateway computer system 120 and appliance computer system 130.

Thus, the method selects a gateway computer system and an appliance computer system, wherein the appliance computer system is logically interconnected with the gateway computer system. As discussed above, the appliance computer system communicates with the gateway computer system using simple object access protocol over secure sockets layer with mutual certificate based authentication. When access is allowed to the gateway computer system and the appliance computer system, the method further comprises receiving content comprising documents of interest and defining explicit metadata, wherein the explicit metadata is expressed by the content. For example, explicit metadata can include the author, title, date of document, size of document, etc.

Following this, derived metadata is defined by analyzing the content, wherein the derived metadata is produced via annotation of the content. Examples of derived metadata include: "source", "date of content", "duplicate", "language", "topic", "sentiment", etc. The method then displays the explicit metadata and the derived metadata and stores the content, the explicit metadata and the derived metadata.

Subsequently, a query is built based on the explicit metadata and the derived metadata. Finally, documents of interest described by the query are retrieved via the gateway computer system and sent to the appliance computer system. As discussed above, this is implemented by exposing a set of well-defined set of simple object access protocol Web Services that translate the appliance computer system's query requests into application program interfaces supported by the cluster computer system.

Additionally, the method can comprise dividing the documents of interest into segments, based on when the documents of interest were stored, and sending the segments to the appliance computer system incrementally. As discussed above, for large amounts of data (i.e., millions of crawled web pages) retrieval takes a long time to complete and it is not desired to restart the whole process if failure occurred. Thus, the segmenting process runs sequentially, retrieving documents for dates within user defined time intervals (e.g., six months). Furthermore, to control the workloads of the gateway computer system and the appliance computer system, the rate that the documents of interest are retrieved can be adjusted; and/or, the documents of interest can be compressed.

Figure 3:
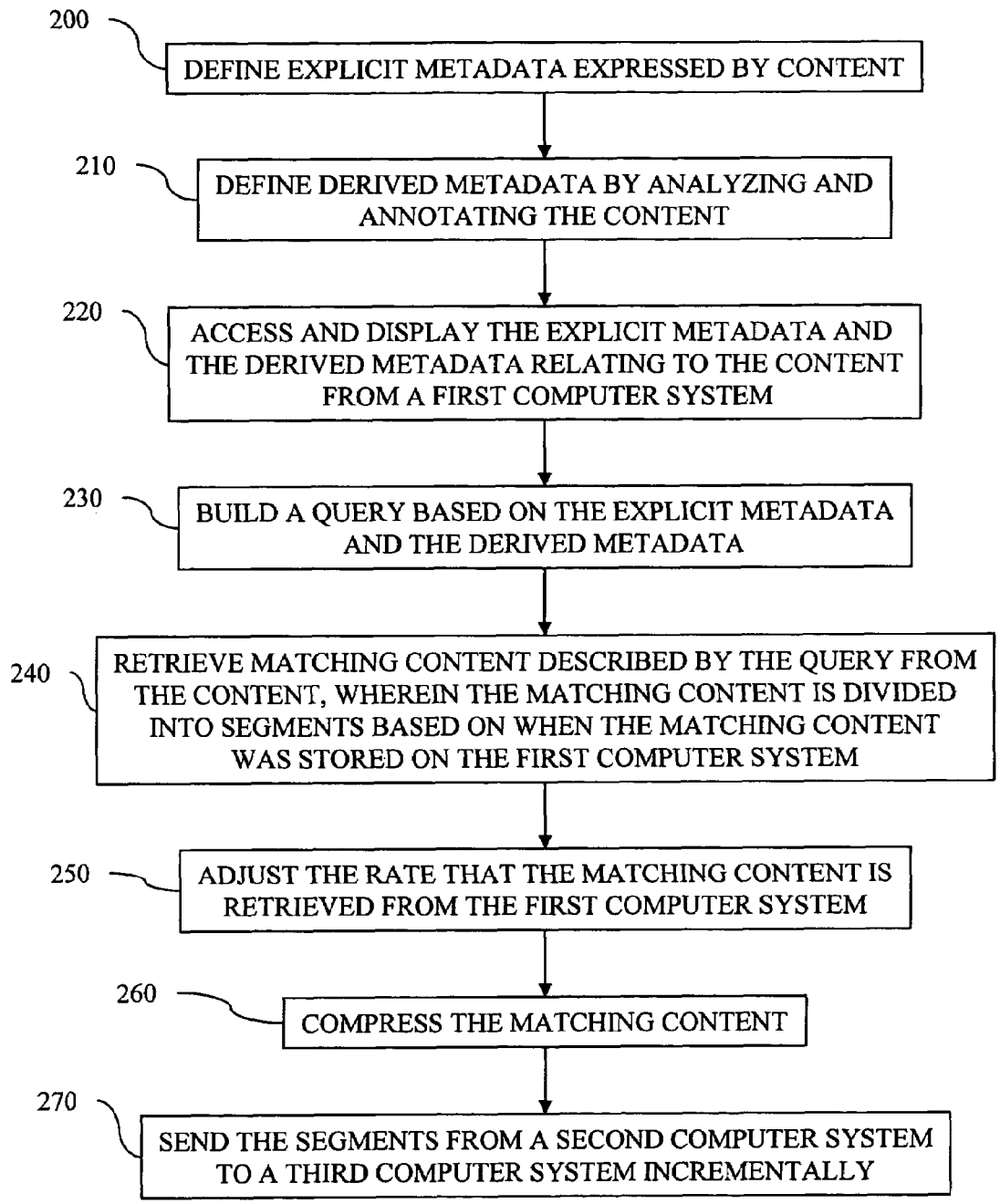
FIG. 3 is another flow diagram illustrating a method of the invention.

FIG. 3 illustrates a flow diagram of a method for identifying and delivering domain specific unstructured content for advanced business analysis. In item 200, explicit metadata is defined, wherein the explicit metadata is expressed by the content. For example, explicit metadata can include the author, title, date of document, size of document, etc. In item 210, derived metadata is defined by analyzing and annotating the content. Examples of derived metadata include: "source", "date of content", "duplicate", "language", "topic", "sentiment", etc.

Following this, in item 220, the explicit metadata and the derived metadata relating to the content are accessed and displayed from a first computer system. As discussed above, the first computer system (i.e., cluster computer system 110) is part of a web-scale mining and discovery platform containing distributed repositories with large sets of ambiguous unstructured data and metadata. Following this, in item 230, a query is built based on the explicit metadata and the derived metadata. Thus, matching content described by the query is retrieved from the content (item 240). As further discussed above, this is implemented by exposing a set of well-defined set of simple object access protocol Web Services that translate a third computer system's (i.e., appliance computer system 130's) query requests into application program interfaces supported by the first computer system.

Moreover, the matching content can be divided into segments based on when the matching content was stored on the first computer system. As discussed above, for large amounts of data (i.e., millions of crawled web pages) retrieval takes a long time to complete and it is not desired to restart the whole process if failure occurred. Thus, the segmenting process runs sequentially, retrieving documents for dates within user defined time intervals (e.g., six months).

To control the workloads of a second computer system (i.e., gateway computer system 120) and the third computer system, the rate that the matching content is retrieved from the first computer system can be adjusted (item 250) and/or the matching content can be compressed (item 260). Subsequently, in item 270, the segments can be sent to the third computer system incrementally. As further discussed above, the third computer system communicates with the second computer system (i.e., gateway computer system 120) using simple object access protocol over secure sockets layer (SSL) with mutual certificate based authentication.

Accordingly, the appliance computer system can be leveraged to design and implement an automated process for identifying and delivering domain specific unstructured content. This process involves a new architecture that allows users and application developers to access only domain specific metadata of interest (e.g. automotive industry data) stored on the cluster computer system, store this data on the appliance computer system, and then use it for more advanced analysis as part of developing their custom business applications. Furthermore, this process is characterized by a set of user-defined features, which include strong security, metering, status monitoring, scheduling, incremental updates, segmented runs, throttling, and compressed data transfer.

This solution is cost efficient and provides an automated process for leveraging existing platform capabilities, creating domain specific unstructured content on demand for further analysis and processing, and supporting an array of technical features that provide users the option to customize and quickly adapt their applications on demand. Although the concept of the appliance computer system is not new, it has never been used before for creating domain specific "on-topic-stores" on demand, based on user's queries, for the purpose of providing complex business analysis.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

What is claimed is:

1. A system for identifying and delivering documents of interest for business analysis, comprising:
    a cluster computer system that stores unstructured content, including documents of interest, said unstructured content comprising web documents and metadata, said cluster computer system being configured to: analyze, over a first segment of time, said unstructured content in accordance with a first user's query to identify web documents and metadata of interest; and store said metadata of interest,
        wherein said metadata comprises explicit metadata and derived metadata, said explicit metadata comprising data that is expressly defined by said unstructured content, and said derived metadata comprising data that is derived by analyzing said unstructured content;
    an analysis engine operatively connected to said cluster computer system, said analysis engine deriving said derived metadata as annotation of said unstructured content in response to said first user's query;
    a gateway computer system interposed between said cluster computer system and an appliance computer system, said gateway computer system being configured to: forward said first user's query to said cluster computer system from said appliance computer system; retrieve said web documents and said metadata of interest from said cluster computer system in response to said first user's query at a conclusion of said first period of time; and send said retrieved web documents and said retrieved metadata of interest to said appliance computer system,
        wherein said web documents and said metadata are time stamped according to a time of storage by said cluster computer system; and
    said appliance computer system logically interconnected to said gateway computer system, said appliance computer system being configured to: display said retrieved metadata; store said retrieved web documents and said retrieved metadata of interest identified by said first user's query; and build, by a user, a second user's query based on said displayed web documents and metadata of interest, said second user's query being associated with a second sequential segment of time,
        wherein said web documents and said metadata of interest identified by said first user's query are available on demand to said user at said conclusion of said first segment of time for conducting business analysis by said appliance computer system.

2. The system according to claim 1, further comprising a throttling component operatively connected to said appliance computer system for adjusting a rate that said web documents and metadata of interest are retrieved via said gateway computer system from said cluster computer system, wherein said throttling component controls workloads of said gateway computer system and said appliance computer system.

3. The system according to claim 1, further comprising a compression component operatively connected to said cluster computer system for compressing said web documents and metadata of interest, wherein said compression component controls workloads of said gateway computer system and said appliance computer system.

4. A method for identifying and delivering documents of interest for business analysis, comprising:
    storing unstructured content, including documents of interest, said unstructured content comprising web documents and metadata, in a cluster computer system;
    analyzing, by said cluster computer system, said unstructured content, over a first segment of time, in accordance with a first user's query to identify web documents and metadata of interest;
    storing said metadata of interest in said cluster computer system;
        wherein said metadata comprises explicit metadata and derived metadata, said explicit metadata comprising data that is expressly defined by said unstructured content, and said
    derived metadata comprising data that is derived by analyzing said unstructured content; deriving said derived metadata as annotation of said unstructured content in response to said first user's query;

forwarding, by a gateway computer system interposed between said cluster computer system and an appliance computer system, said first user's query to said cluster computer system from said appliance computer system;

retrieving, by said gateway computer system, said web documents and said metadata of interest from said cluster computer system in response to said first user's query at a conclusion of said first period of time;

sending, by said gateway computer system, said retrieved web documents and said retrieved metadata of interest to said appliance computer system, wherein said web documents and said metadata are time stamped according to a time of storage by said cluster computer system;

displaying, by said appliance computer system, said retrieved metadata;

storing, by said appliance computer system, said retrieved web documents and said retrieved metadata of interest identified by said first user's query; and building, by a user, on said appliance computer system, a second user's query based on said displayed web documents and metadata of interest, said second user's query being associated with a second sequential segment of time, wherein said web documents and said metadata of interest identified by said first user's query are available on demand to said user at said conclusion of said first segment of time for conducting business analysis by said appliance computer system.

5. The method according to claim 4, further comprising adjusting a rate that said web documents and metadata of interest are retrieved from said cluster computer system via said gateway computer system, wherein said adjusting controls workloads of said gateway computer system and said appliance computer system.

6. The method according to claim 4, further comprising compressing said web documents and metadata of interest, wherein said compressing controls workloads of said gateway computer system and said appliance computer system.

* * * * *

UNITED STATES PATENT AND TRADEMARK OFFICE
CERTIFICATE OF CORRECTION

PATENT NO. : 7,657,585 B2
APPLICATION NO. : 11/257880
DATED : February 2, 2010
INVENTOR(S) : Neeraj Agrawal It is certified that error appears in the above-identified patent and that said Letters Patent is hereby corrected as shown below:

Title Page, Item (73) Assignee should read:
--International Business Machines Corporation, Armonk, NY--

Signed and Sealed this

Eighteenth Day of May, 2010

David J. Kappos
*Director of the United States Patent and Trademark Office*